United States Patent [19]

Watanabe

[11] Patent Number: 4,549,225
[45] Date of Patent: Oct. 22, 1985

[54] COLOR VIDEO SIGNAL PROCESSING CIRCUIT FOR PERFORMING LEVEL CONTROL AND TIME AXIS DEVIATION COMPENSATION

[75] Inventor: Yasuaki Watanabe, Kasukabe, Japan

[73] Assignee: Victor Company of Japan, Ltd., Yokohama, Japan

[21] Appl. No.: 310,131

[22] Filed: Oct. 9, 1981

[30] Foreign Application Priority Data

Oct. 13, 1980 [JP] Japan .............................. 55-142753

[51] Int. Cl.$^4$ .......................................... H04N 9/493
[52] U.S. Cl. .................................. 358/316; 358/315; 358/19; 358/30
[58] Field of Search .................... 358/19, 27, 315–318, 358/31

[56] References Cited

U.S. PATENT DOCUMENTS

| 3,872,497 | 3/1975 | Amery et al. |
| 3,949,414 | 4/1976 | Hayashi ............................ 358/27 X |
| 3,996,610 | 12/1976 | Kawamoto |
| 4,041,526 | 8/1977 | Kaneko ............................. 358/317 |
| 4,068,256 | 1/1978 | Tsuchiya et al. ................... 358/319 |
| 4,068,257 | 1/1978 | Hirota et al. |
| 4,110,761 | 8/1978 | Watatani |
| 4,205,335 | 5/1980 | Nakagawa et al. .................. 358/31 |
| 4,268,854 | 5/1981 | Ozawa ............................. 358/27 |
| 4,356,506 | 10/1982 | Yamamitsu ....................... 358/318 X |
| 4,400,742 | 8/1983 | Yamamitsu et al. ................ 358/318 |

FOREIGN PATENT DOCUMENTS

| 111392 | 3/1981 | Japan ............................. 358/310 |
| 1468894 | 3/1977 | United Kingdom |
| 1496707 | 12/1977 | United Kingdom |
| 1506988 | 4/1978 | United Kingdom |
| 1512100 | 5/1978 | United Kingdom |
| 2067376 | 7/1981 | United Kingdom |

Primary Examiner—Raymond F. Cardillo, Jr.
Assistant Examiner—Alan K. Aldous
Attorney, Agent, or Firm—Louis Bernat

[57] ABSTRACT

A reproduced color video signal processing circuit in a rotary recording medium reproducing apparatus reproduces a recorded signal from a rotary recording medium which is recorded with a composite color video signal in which a carrier chrominance signal is frequency-converted into a low frequency band and multiplexed using a common frequency band within a part of a frequency band of a luminance signal, and levels of the carrier chrominance signal and a color burst signal are controlled according to the level of the carrier chrominance signal with respect to the color burst signal. The processing circuit comprises a carrier chrominance signal obtaining circuit for obtaining a carrier chrominance signal returned to the original frequency band by frequency-converting the reproduced composite color video signal, a level controlling circuit for controlling the level of the color burst signal to a constant value according to the level of the color burst signal within the carrier chrominance signal thus obtained, a time axis deviation compensation circuit for substantially compensating for a time axis deviation component of the carrier chrominance signal which is to be obtained by the carrier chrominance signal obtaining circuit, a time axis deviation component adding and frequency converting circuit for adding the time axis deviation component to the carrier chrominance signal thus obtained, and frequency-converting and returning the carrier chrominance signal to the low frequency band, and a luminance signal obtaining circuit for obtaining the luminance signal by subtracting the carrier chrominance signal returned to the low frequency band from the reproduced composite color video signal.

2 Claims, 8 Drawing Figures

4,549,225

COLOR VIDEO SIGNAL PROCESSING CIRCUIT FOR PERFORMING LEVEL CONTROL AND TIME AXIS DEVIATION COMPENSATION

BACKGROUND OF THE INVENTION

The present invention generally related to reproduced color video signal processing circuits for processing color video signals reproduced from rotary recording mediums, and more particularly to a reproduced color video signal processing circuit in a rotary recording medium reproducing apparatus which reproduces a recorded composite color video signal from a rotary recording medium, wherein the rotary recording medium is recorded with the composite color video signal so that level control is performed to reduce a total level when a carrier chrominance signal level exceeds a color burst signal level as a result of comparing the color burst signal and the carrier chrominance signal.

Reproducing apparatuses have been reduced to practice, for reproducing a recorded color video signal from a rotary recording medium recorded with the color video signal on a spiral track.

In a recording system for recording the color video signal onto a rotary recording medium of the above type, it is desirable to perform recording in a state where the signal components are as large as possible, and pre-emphasis is accordingly performed with respect to the signal which are recorded. However, when the above operation is performed, an unwanted projecting signal component of a whisker shape is introduced. Hence, a clipping operation is performed to eliminate the above unwanted signal component. Moreover, in a case where the amplitude of the carrier chrominance signal within the color video signal is too large and exceeds the clipping level, there is a disadvantage in that the carrier chrominance signal is unnecessarily clipped. Therefore, in the above recording system, the levels of the color burst signal and the carrier chrominance signal are compared, and level control is performed so that a total level is reduced to within a predetermined range (for example, 6 dB at the maximum) when the carrier chrominance signal level becomes higher than the color burst signal level.

In a case where the above level control is performed, the color burst signal is reproduced as a signal with a relatively low level. Therefore, according to the state of the level control performed in the recording system in accordance with the carrier chrominance signal level, the level of the color burst signal of the carrier chrominance signal reproduced in the reproducing system becomes inconsistent and irregular.

SUMMARY OF THE INVENTION

Accordingly, it is a general object of the present invention to provide a novel and useful reproduced color video signal processing circuit in a rotary recording medium reproducing apparatus, in which the above described problems have been eliminated.

Another and more specific object of the present invention is to provide a reproduced color video processing circuit which reproduces a color video signal from a rotary recording medium recorded in the above described manner, and performs a control operation so that the level of a color burst signal becomes constant. Moreover, since there is a limit to the transmission frequency band of the recorded signal, the carrier chrominance signal (the chrominance sub-carrier frequency is 3.58 MHz in a case where the color video signal is of the NTSC system) is frequency-converted to a low frequency in a state using a common frequency band within a high frequency range of the luminance signal, and is recorded as a multiplexed composite color video signal. Thus, in the reproducing system, the luminance signal component and the carrier chrominance signal component must be effectively separated, and the carrier chrominance signal must be returned to the original frequency band. Furthermore, time axis deviation components of both the luminance signal and the carrier chrominance signal must be eliminated. Accordingly, the reproduced color video signal processing circuit according to the present invention is constructed so as to operate in a manner satisfying the above described demands.

Other objects and further features of the present invention will be apparent from the following detailed description when read in conjunction with the accompanying drawings.

DETAILED DESCRIPTION

Figure 1:
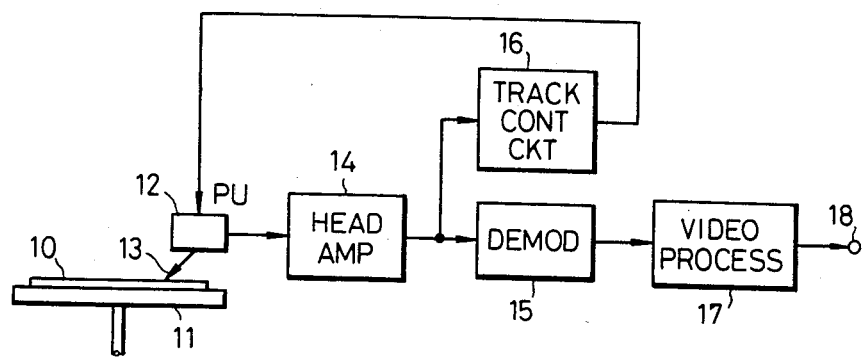
FIG. 1 is a systematic block diagram showing an example of a rotary recording medium reproducing apparatus.

In FIG. 1, a rotary recording medium (hereinafter simply referred to as a disc) 10 in which a color video signal is recorded, is rotated at a predetermined speed by a turntable 11. This color video signal is obtained, for example, by separating an NTSC system color video signal having a chrominance sub-carrier frequency of 3.58 MHz into a luminance signal and a carrier chrominance signal, frequency-converting the carrier chrominance signal so that the chrominance sub-carrier frequency becomes 2.56 MHz, and by multiplexing the frequency-converted carrier chrominance signal in a state using a common frequency band within a high frequency range of the luminance signal whose frequency band is limited to 3 MHz. That is, the above color video signal is a signal obtained by frequency-modulating a signal having a frequency spectrum indicated in FIG. 3A. Moreover, as described above, the levels of the carrier chrominance signal and the color burst signal are compared. In a case where the carrier chrominance signal level is higher than the color burst signal level, level control is performed so as to reduce the total level.

A reproducing stylus 13 of a signal pickup device 12 makes contact with the recording surface of the disc 10, to pickup and reproduce the recorded signal from the disc 10. In the present embodiment of the invention, the video signal is recorded on the disc 10 as a variation in geometrical configuration, and the recorded video signal is reproduced from the disc 10 due to variation in the electrostatic capacitance between the disc 10 and an electrode of the reproducing stylus 13. Further, reference signals for performing tracking control are recorded on the disc 10 besides the video signal, and these reference signals are reproduced together with the video signal.

The signal picked up and reproduced from the disc 10, is supplied to a demodulator 15 and a tracking control circuit 16 through a head amplifier 14. Reference signals for tracking control are separated at the tracking control circuit 16, and a tracking control signal is formed from these reference signals. The tracking control signal thus formed by the tracking control circuit 16 is supplied to a coil used for tracking within the pickup device 12. Accordingly, tracking control is performed so that the reproducing stylus 13 accurately scans over the video signal tracks on the disc 10.

On the other hand, the picked up video signal is demodulated at the demodulator 15, and then supplied to a color video signal processing circuit 17 according to the present invention wherein a predetermined signal processing is performed. Hence, the demodulated video signal thus subjected to the predetermined signal processing, is supplied to an image receiving tube (not shown) of a receiver from a terminal 18, and reproduced as a reproduced picture.

Figure 2:
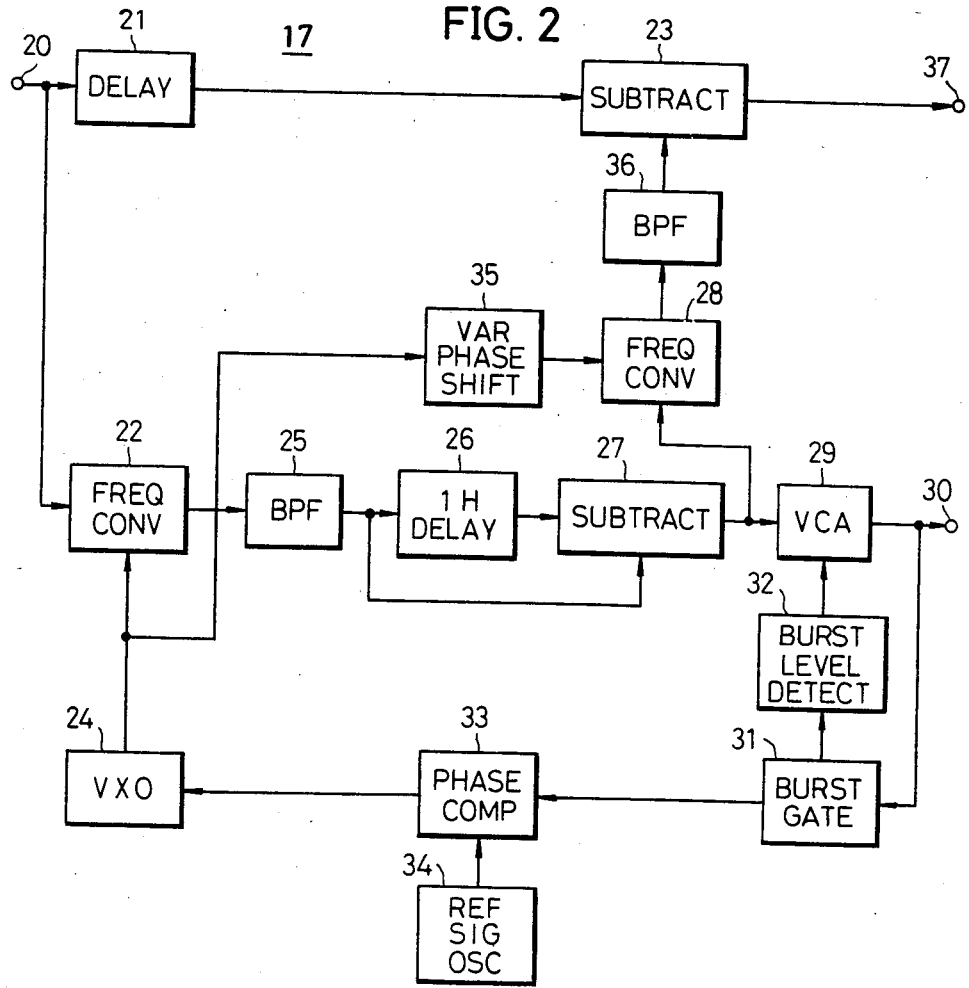
FIG. 2 is a systematic block diagram showing an embodiment of a reproduced color video signal processing circuit according to the present invention.

Next, description will be given with respect to an embodiment of the color video signal processing circuit 17, in conjunction with a block system shown in FIG. 2. A demodulated signal obtained from the demodulator 15 is supplied to a delay circuit 21 and a frequency converter 22, through a terminal 20. The demodulated signal from the demodulator 15 has a frequency spectrum indicated in FIG. 3A, for example, and consists of a luminance signal occupying a frequency band I between zero to 3 MHz, and a carrier chrominance signal occupying a frequency band II within a range of ±500 kHz from a center which is a chrominance sub-carrier frequency of 2.56 MHz. The above carrier chrominance signal is multiplexed in a state using a common frequency band within a high frequency range of the luminance signal.

Figure 3A:
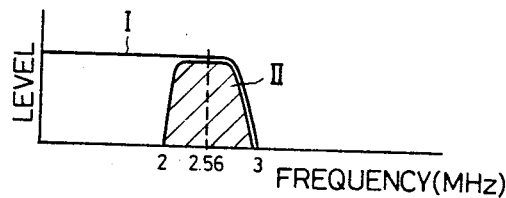
FIGS. 3A through 3F are diagrams respectively showing frequency spectrums of signals at each part of the block system shown in FIG. 2.

The demodulated signal indicated in FIG. 3A which is supplied to the delay circuit 21, is delayed by a delay quantity which is equal to a delay quantity added to a signal within a circuit system for obtaining the carrier chrominance signal which will be described hereinafter. That is, the above demodulated signal is delayed in order to adjust the timing of the signal, and then supplied to a subtracting circuit 23.

Figure 3B:
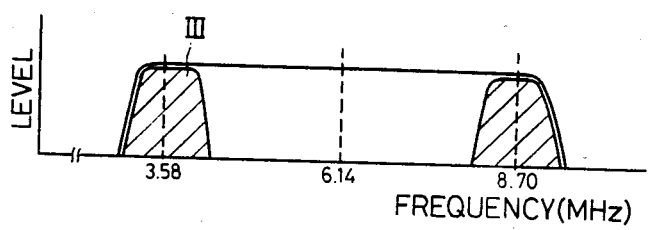
Figure 3C:
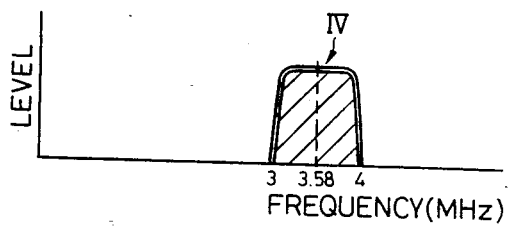

The frequency converter 22 consists of a balanced modulator, and is supplied with an output oscillation signal of 6.14 MHz from a voltage controlled crystal oscillator (hereinafter simply referred to as a VXO) 24. The frequency converter 22 subjects the above signal of 6.14 MHz to a balanced modulation with the demodulated signal obtained from the terminal 20. An output signal of the frequency converter 22 is supplied to a bandpass filter 25. The output signal of the above frequency converter 22 has a frequency spectrum indicated in FIG. 3B, wherein a carrier chrominance signal component III of a frequency band of 3.58 MHz±500 kHz corresponding to the above frequency band II, exists at the lower side of the frequency band. A signal having the same frequency band part as the above signal component III and the luminance signal, as indicated in FIG. 3C, is passed through the bandpass filter 25 as a signal component IV.

The signal component IV which has passed through the bandpass filter 25 is supplied directly to a subtracting circuit 27 on one hand, and supplied to the subtracting circuit 27 through a 1H-delay circuit 26 (H indicates a horizontal scanning period) on the other. The above 1H-delay circuit 26 and the subtracting circuit 27 construct a known comb filter. Subtraction is performed between the signal from the bandpass filter 25 and the signal from the 1H-delay circuit 26. Hence, only the carrier chrominance signal V indicated in FIG. 3D having a frequency band of 3.58 MHz 500 Hz is obtained. This carrier chrominance signal has a chrominance sub-carrier frequency of 3.58 MHz, and is returned to the original frequency band.

The output signal of the subtracting circuit 27 is supplied to a frequency converter 28 which will be described hereinafter, and also to a voltage controlled amplifier (hereinafter simply referred to as a VCA) 29. The carrier chrominance signal V which has passed through the VCA 29 is obtained through an output terminal 30, and is also supplied to a burst gate circuit 31. The color burst signal is extracted at the burst gate circuit 31, and supplied to a burst level detection circuit 32 and to a phase comparator 33.

The level of the extracted color burst signal is detected at the burst level detection circuit 32, and the detection circuit 32 applies a control voltage which is in accordance with the detected level to the VCA 29. The amplification of the above VCA 29 is controlled by the control signal from the detection circuit 32, so that the level of the color burst signal is controlled to become constant. Accordingly, as described above, even when the color burst signal is recorded at a relatively low level in the recording system due to the relationship between the carrier chrominance signal level, the level of the color burst signal is always controlled to a constant level by a loop constructed by the above described VCA 29, the burst gate circuit 31, and the burst level detection circuit 32. Thus, the level of the color burst signal within the carrier chrominance signal obtained from the terminal 30 is always maintained to a constant level.

The phase of the color burst signal supplied to the phase comparator 33 is compared with the phase of a reference signal having a stable frequency of 3.58 MHz. An output error voltage obtained from the phase comparator 33 is applied to the VXO 24, to variably control the oscillation frequency of the VXO 24. The modulated video signal applied to the terminal 20 includes time axis deviation components due to rotational deviation, eccentricity, and the like introduced in the disc 10. Accordingly, the above time axis deviation is included in the output of the VXO 24, due to an automatic phase compensation (APC) loop including the frequency converter 22, the bandpass filter 25, 1H-delay circuit 26, the subtracting circuit 27, the VCA 29, the burst gate circuit 31, the phase comparator 33, a reference signal oscillator 34, and the VXO 24. This time axis deviation component is eliminated by the frequency converter 22. Therefore, the time axis deviation component is eliminated from the carrier chrominance signal which is obtained through the terminal 30.

As described above, the level of the color burst signal is always controlled to a constant level by the loop which is constructed by the VCA 29, the burst gate circuit 31, and the burst level detection circuit 32. Hence, the level deviation is eliminated from the carrier chrominance signal which is supplied to the phase comparator 33. Accordingly, the detection sensitivity of the phase comparator 33 can be set to a constant value, that is, the loop gain of the above described APC loop can be maintained at a constant value.

Figure 3D:
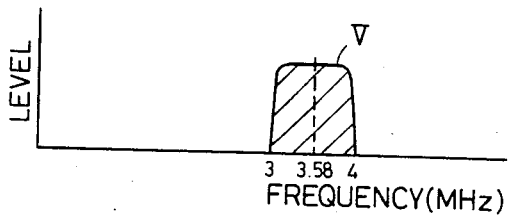
Figure 3E:
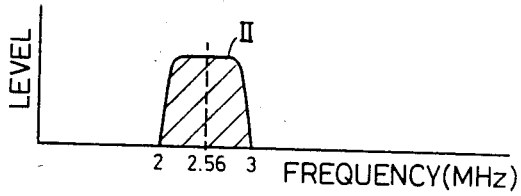

The frequency converter 28 which is supplied with the carrier chrominance signal V indicated in FIG. 3D which is obtained from the above subtracting circuit 27, consists of a balanced modulator. On the other hand, the signal from the VXO 24 having a frequency of 6.14 MHz and including a deviation component which is in accordance with the above time axis deviation, is supplied to a variable phase shifter 35. The signal thus supplied to the variable phase shifter 35 is adjusted of the phase with respect to the demodulated composite color video signal which passes through the delay circuit 21. This signal which is subjected to the phase adjustment, is supplied to the frequency converter 28. The frequency converter 28 subjects the signal from the variable phase shifter 35 having a frequency of 6.14 MHz to a balanced modulation by the carrier chrominance signal obtained from the subtracting circuit 27. Thus, the output signal of the frequency converter 28 is supplied to a bandpass filter 36, wherein only the lower side of the frequency band is obtained. An output signal of the bandpass filter 36 is the carrier chrominance signal II having a frequency band of 2.56 MHz±500 kHz as indicated in FIG. 3E. This output signal of the bandpass filter 36 includes a similar time axis deviation component as the demodulated composite video signal obtained from the terminal 20.

Figure 3F:
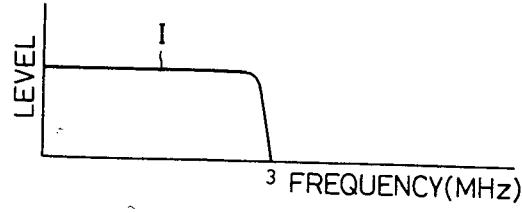

The above output carrier chrominance signal II of the bandpass filter 36 is supplied to the subtracting circuit 23. Subtraction is performed between the carrier chrominance signal II and the demodulated composite color video signals I and II indicated in FIG. 3A which are obtained from the delay circuit 21 through the terminal 20, at the above subtracting circuit 23. Accordingly, only the luminance signal I indicated in FIG. 3F is obtained from the subtraction circuit 23, and produced through a terminal 37.

Therefore, the luminance signal and the carrier chrominance signal can be effectively separated from the demodulated composite color video signal in which the luminance signal and the carrier chrominance signal are multiplexed with a common frequency band. Moreover, with respect to the carrier chrominance signal component, the frequency band is returned to the original frequency band, and the time axis deviation component is eliminated. Furthermore, the color burst signal component can be obtained with a constant level.

In a case where the reproduced color video signal is to be obtained as it is as the NTSC system color video signal, the carrier chrominance signal from the terminal 30 and the luminance signal from the terminal 37 are multiplexed as they are, and produced through the terminal 18. In addition, when the reproduced color video signal is to be obtained as an artificial PAL or SECAM system color video signal, predetermined signal processing operations are respectively performed at the terminals 30 and 37, before multiplexing the carrier chrominance signal and the luminance signal and producing the signal through the terminal 18.

Further, the present invention is not limited to these embodiments, but various variations and modifications may be made without departing from the scope of the present invention.

What is claimed is:

1. A reproduced color video signal processing circuit in a reproducing apparatus for reproducing a composite color video signal from a rotary recording medium on which the composite color video signal has been recorded, wherein the composite color video signal comprises a luminance signal and a carrier chrominance signal which has been frequency-converted into a low frequency band which is lower than its original frequency band, and then combined with the luminance signal in a commonly shared band within a part of the frequency band of the luminance signal, and wherein the level of the carrier chrominance signal including a color burst signal has been controlled according to the level of the original carrier chrominance signal with respect to the color burst signal included in the original carrier chrominance signal, said processing circuit comprising:

separating means for separating the luminance signal from the reproduced composite color video signal, obtaining means for obtaining from the reproduced composite color video signal a carrier chrominance signal restored to the original frequency band, said obtaining means having:

a voltage controlled oscillator, mixing means for mixing the reproduced composite video signal with an output signal of said voltage controlled oscillator, filter means coupled to said mixing means for filtering frequency components from the output signal of the mixing means, said frequency components lying in the original frequency band of the carrier chrominance signal, comb filter means responsive to said filter means for filtering the carrier chrominance signal from the output signal of the filter, the carrier chrominance signal being restored to the original frequency band, voltage controlled amplifier means coupled to the comb filter means, gating means responsive to said comb filter means for extracting the color burst signal from the output signal of the comb filter means, said gating means receiving the output signal of the comb filter means via the voltage controlled amplifier, reference oscillator means, phase comparator means responsive to said gating means and to said reference oscillator means for comparing the phase of the extracted color burst signal with the phase of an output signal of said reference oscillator means to produce a phase error signal which is a control voltage supplied to the voltage controlled oscillator, and an output terminal connected to the output side of the voltage controlled amplifier means for delivering the carrier chrominance signal restored to the original frequency band, and the separating means having:

detecting means responsive to the gating means for detecting the level of the color burst signal extracted by the gating means, the gain of said voltage controlled amplifier means being controlled responsive to the output signal of the detecting means for holding a substantially constant level of the color burst signal in the output signal, frequency-converting means jointly responsive to at least a phase based on the output signal of the voltage controlled oscillator and to the output signal of the comb filter for again frequency-converting the carrier chrominance signal from the original frequency band to the low frequency band; and subtracting means responsive to said frequency-converting means for subtracting the output signal of the frequency converting means from the reproduced composite color video signal in order to obtain the luminance signal.

2. The processing circuit as claimed in claim 1 which further comprises a variable phase shifter means responsive to the voltage controlled oscillator for shifting the phase of the output signal of the voltage controlled oscillator by a predetermined quantity to supply the phase-shifted signal to the frequency-converting means.

* * * * *